(12) United States Patent
Prince

(10) Patent No.: US 8,717,418 B1
(45) Date of Patent: May 6, 2014

(54) REAL TIME 3D IMAGING FOR REMOTE SURVEILLANCE

(76) Inventor: John Prince, Los Altos, CA (US)

( * ) Notice: Subject to any disclaimer, the term of this patent is extended or adjusted under 35 U.S.C. 154(b) by 437 days.

(21) Appl. No.: 12/931,698

(22) Filed: Feb. 8, 2011

(51) Int. Cl.
*H04N 13/02* (2006.01)
(52) U.S. Cl.
USPC .......................................................... 348/46
(58) Field of Classification Search
USPC ................... 348/43, 35, 135, 145, 46, 47, 50;
345/419; 351/212; 382/104, 133, 154,
382/168; 396/287; 701/45, 301
See application file for complete search history.

(56) References Cited

U.S. PATENT DOCUMENTS

| | | | |
|---|---|---|---|
| 5,428,386 A | 6/1995 | D'Alfonso et al. | 348/45 |
| 5,986,694 A * | 11/1999 | Iino | 348/135 |
| 5,993,001 A * | 11/1999 | Bursell et al. | 351/212 |
| 6,556,196 B1 * | 4/2003 | Blanz et al. | 345/419 |
| 6,747,686 B1 * | 6/2004 | Bennett | 348/145 |
| 7,239,760 B2 * | 7/2007 | Di Bernardo et al. | 382/305 |
| 7,272,179 B2 | 9/2007 | Siemens et al. | 348/240.01 |
| 7,505,841 B2 * | 3/2009 | Sun et al. | 701/45 |
| 7,616,782 B2 * | 11/2009 | Badawy | 382/107 |
| 7,706,677 B2 * | 4/2010 | Cho et al. | 396/287 |
| 7,986,810 B2 * | 7/2011 | Badawy | 382/103 |
| 8,405,709 B2 * | 3/2013 | Hirasawa et al. | 348/43 |
| 8,526,492 B2 * | 9/2013 | Schwarz et al. | 375/240.02 |
| 2003/0190072 A1 * | 10/2003 | Adkins et al. | 382/154 |
| 2004/0096082 A1 * | 5/2004 | Nakai et al. | 382/104 |
| 2005/0249426 A1 * | 11/2005 | Badawy | 382/241 |
| 2007/0274384 A1 * | 11/2007 | Schwarz et al. | 375/240.12 |
| 2008/0031513 A1 * | 2/2008 | Hart | 382/154 |
| 2009/0074282 A1 * | 3/2009 | Pinard et al. | 382/133 |
| 2009/0202225 A1 * | 8/2009 | Rodriguez et al. | 386/95 |
| 2010/0086050 A1 * | 4/2010 | Badawy | 375/240.16 |
| 2010/0310168 A1 * | 12/2010 | Kass et al. | 382/168 |
| 2011/0103651 A1 * | 5/2011 | Nowak et al. | 382/106 |

* cited by examiner

*Primary Examiner* — Sath V Perungavoor
*Assistant Examiner* — James Pontius
(74) *Attorney, Agent, or Firm* — File-EE-Patents.com; Jay A. Chesavage

(57) ABSTRACT

By defining an angular separation in a train of sequential images, and using an interlaced sequence of pairs of images matched by that defining angle, it is possible to create live 3D video from a single camera mounted on a remote vehicle as though in the in the immediate vicinity of the object being viewed. Such a camera can be mounted on a moving vehicle such as a plane or a satellite In addition, computational power is provided to adaptively (and predictively) smooth out motion irregularities between these image pairs, so that smooth 3D video may be obtained. Continual feature-based correlation between successive frames allows corrections for various transformations so that there is a one-on-one correspondence in size, projection, orientation, etc. between matched frames, which enables capture and display of smooth 3D video.

16 Claims, 9 Drawing Sheets

REAL TIME 3D IMAGING FOR REMOTE SURVEILLANCE

BACKGROUND OF THE INVENTION

1. Field of the Invention

This invention relates to the recording of three-dimensional (3D) images from remote distances, in general for remote surveillance. The invention could, for example, also be used for weather, mapping, tracking ocean currents, seismic surveys or aircraft flight control. It is applicable, in real time, throughout the electro-magnetic spectrum particularly in the visible, infra-red and microwave portions. It may also be used for sonar. Steps in this present invention relate to preparing these images for transmission and display.

2. Description of the Related Art

Most remote tracking, photography or surveillance is done with two-dimensional (2D) recording devices. Separately formed images are recorded and stitched (often much later) to form mosaics of landscapes or geologic formations. Google earth is a good example of mosaic formations. The boundaries of the mosaic sections are very visible with stitch lines. Adjacent frames appear to be taken at different times of day under different weather conditions. Although it may be possible to form stereo pairs from some of these images, it would be done only on a case-by-case basis using huge computing resources.

Synthetic apertures have been long used in aircraft with side-looking radar for taking sequential images of terrain. These images may be stitched and merged to give 2D radar terrain maps. This is almost always done at a later time with ground-based computers. Similarly, synthetic apertures may be used for visual images, with the photos stitched to give 2D panoramas. These photos may be stitched digitally within the cameras. However, this takes time even for 2D, and then only produces still photos The creation of motion 3D is, in comparison, highly complex (See, for example, Avatar). Until the recent arrival of very high-speed chips the complications of transitioning from 2D to 3D stills have been great, and from there to 3D video much greater again.

However, we are now at the point where, with high-speed chips, this can be done. With elegant algorithms we can, in the present invention, now provide imaging methods for acquiring 3D remotely which is as good as being in the presence of the subject observed—be it a person, a building, a football field or a battlefield. With the methods proposed in the present invention we can provide 3D surveillance in very close to real-time, delays of a few seconds being due almost solely to the motion of the camera between sequential images.

In the present invention the irregularities of motion are smoothed out to give virtually real-time 3D video from remote locations, from moving vehicles such as aircraft, and from satellites.

SUMMARY OF THE INVENTION

By defining an angular separation in a train of sequential images, and using a sequence of pairs of images matched by that defining angle, we can create a stream of images for the creation of remote 3D video as though in the presence of the subject. In addition, computational power is provided to adaptively (and predictively) smooth out motion irregularities between these image pairs, so that smooth 3D video may be obtained. Continual feature-based correlation between successive frames allows corrections for various transformations so that there is a one-on-one correspondence in size, projection, orientation, etc. between matched frames, which enables capture and display of smooth 3D video.

For reasons of economy just a small number of features is chosen as registers for each frame. These features serve as tags for a small surrounding block of pixels, which can in turn define the frames and speed tracking.

The emphasis on all operations is speed, so that three dimensional images can be rendered swiftly for surveillance and display. Swifter computation throughput also allows smoothing of objects in motion, resulting in more pleasurable viewing of three-dimensional images.

BRIEF DESCRIPTION OF THE DRAWINGS

This invention, together with further advantages here noted, may best be understood by reference to the following descriptions taken together with the accompanying sheets of drawings, in the several figures of which reference numerals identify like elements, and in which.

DETAILED DESCRIPTION OF THE INVENTION

Figure 1:
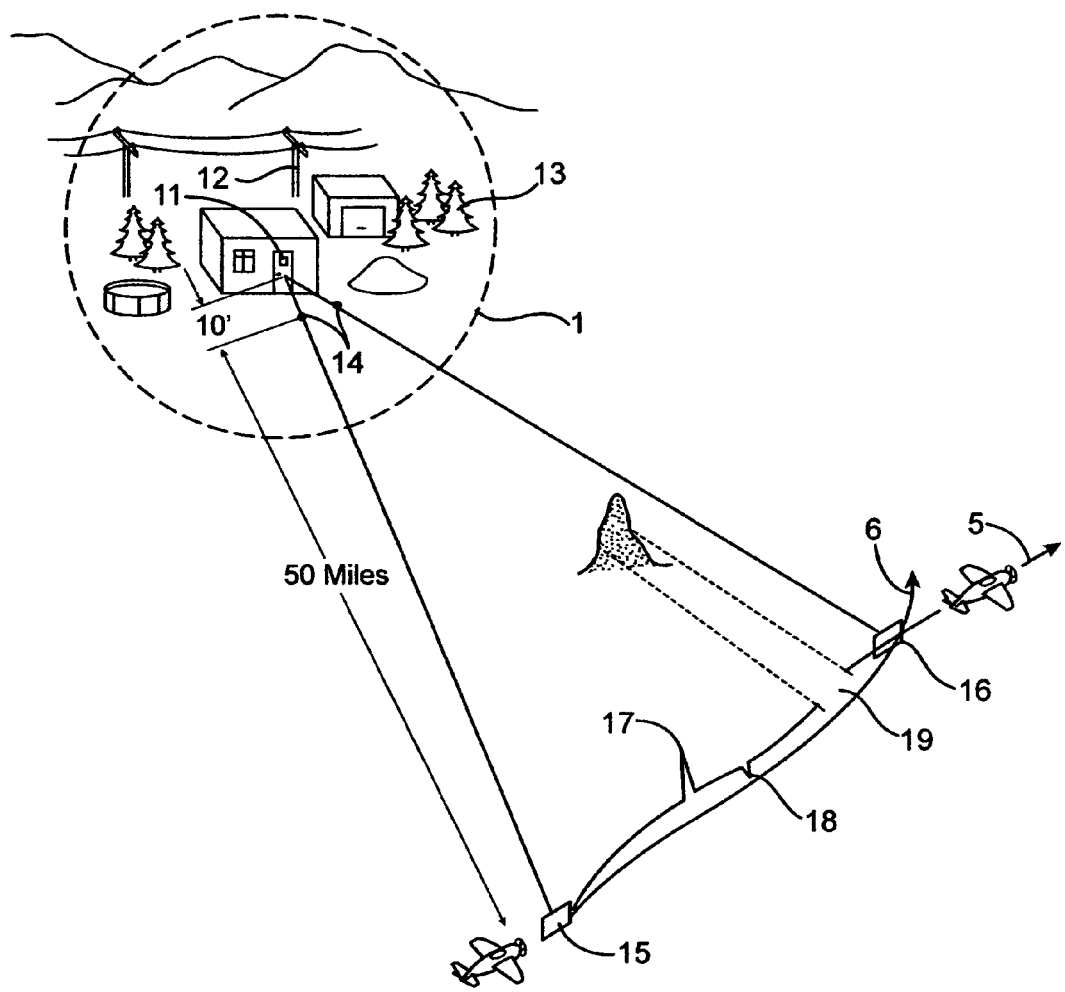
FIG. 1 is a sketch of an object, such as a doorway in a small house, as it observed (for illustration) by a camera on an aircraft from a distance of fifty miles. Shown also are possible pathways covered by an aircraft between successive frames, including interruptions.

FIG. 1 shows an arbitrary scene chosen for surveillance, with features such as a doorway 11 of a house, a telegraph pole 12, and a small tree 13. We choose a dozen such identifiable and traceable objects distributed over the field of view as a framework (within a frame) for tracking. This could be the scene as observed (in this example) by a high-resolution side-looking camera 15 and 16 on an aircraft from a distance such as fifty miles. We note here a sphere 1, which we may call our "sphere of interest". illustrating a concept for making adjustments and smoothing image flow. This will be described later.

We note that certain objects, such as telegraph poles 12, which are vertical, are very convenient for tracking horizontally since their aspect changes little with angle. Features (in general) should be chosen as conspicuous, to "maximize image variance". For the short interval (a few seconds) for recording stereo images even shadows are acceptable. A few objects of interest may be chosen out of necessity as subjects for surveillance and also tracked as features. Complications occur in 3D video if these objects are moving (more later).

FIG. 1 shows a possible pathway 5 of an observing vehicle (in this case aircraft) as it moves from 15 to 16, with bumps, excursions 17 and 18 (and sometimes obscurations 19) included, and for which we must compensate as we match frames. The trend-line 6 is also shown in this and subsequent drawings and will be explained.

Figure 2:
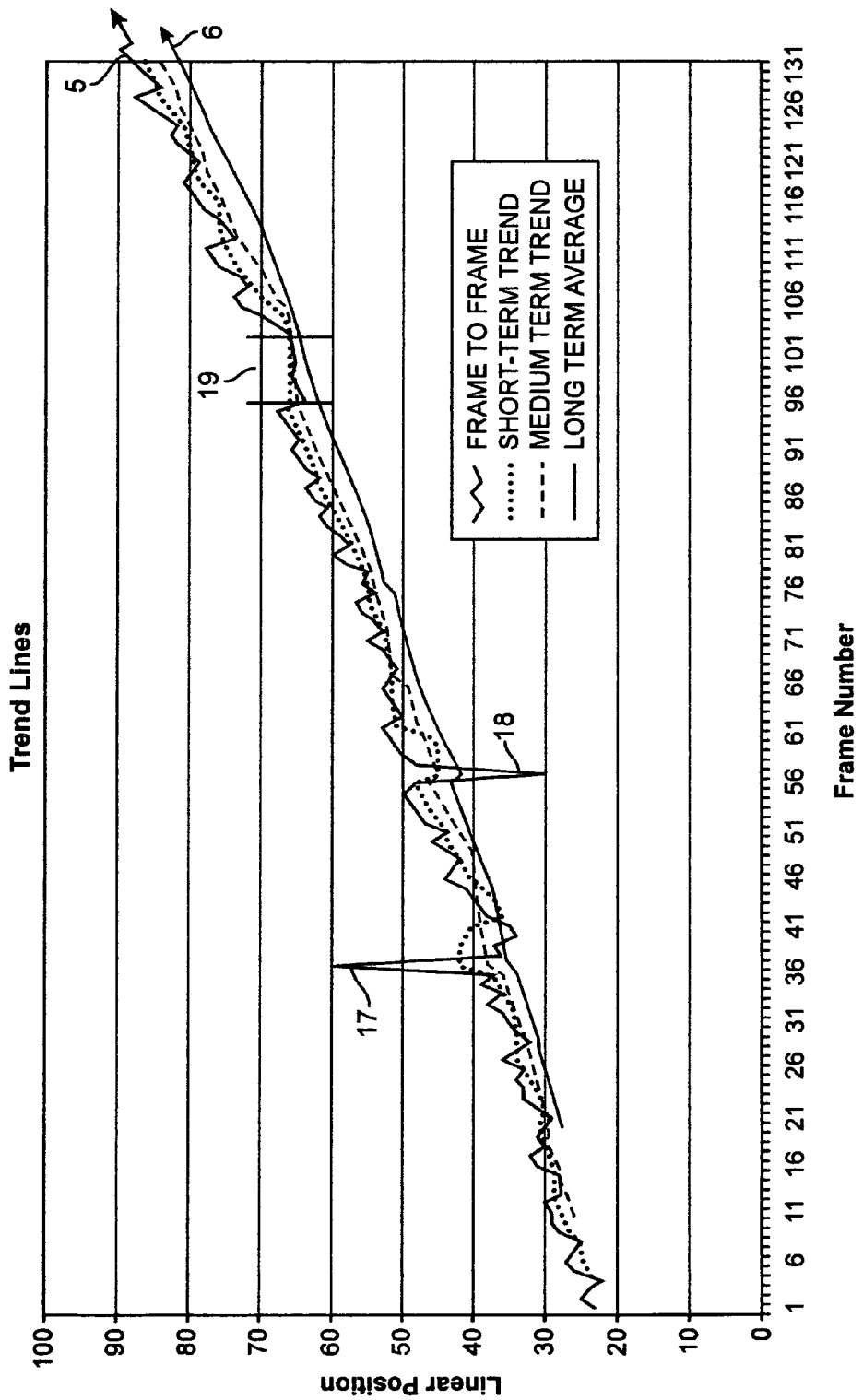
FIG. 2 shows these interruptions in graphic form with trend lines

FIG. 2 is a graphic illustration of the minor oscillations of the camera, as well as the bumps 17 and 18, and obscurations 19. Drawn are several trend lines (such as 6) which are useful predictively, as will be shown later.

These bumps are in addition to the various possible types of image transformation during transit—translation, rotation, similarity, affine and projective—on pathway 5 for which we will describe amending techniques (and in fact shortcuts). In general, for an aircraft flying at altitude (and especially for a satellite) we can expect fairly smooth transitions from frame to frame—which (we hope) will result mostly in lower order transformations (such as translation), simplifying our calculations.

We consider now an appropriate stereo separation required for adequate 3D viewing.

Figure 3:
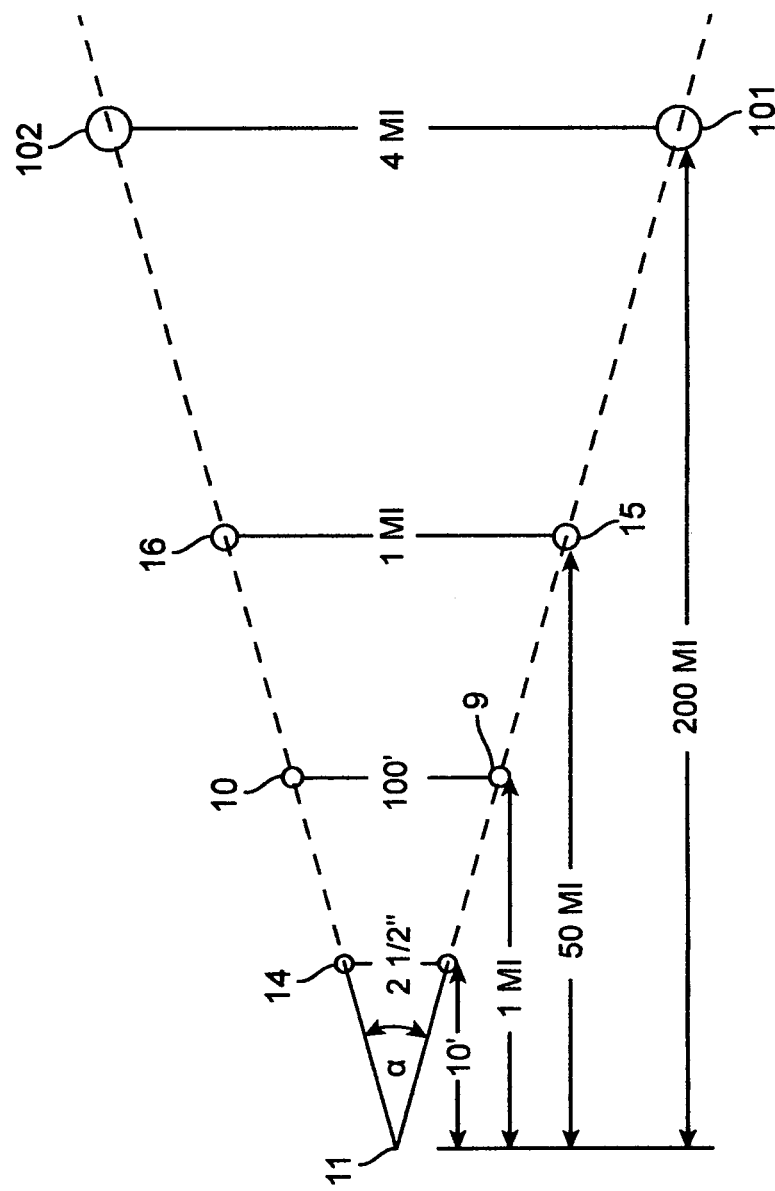
FIG. 3 shows the camera separation needed for successive matching frames for good stereo vision, (for example) equal to a human standing at 10 feet from an object (a stereo separation of 1°).

Referring to FIG. 3 we may compute some numbers as to the time (and distance) intervals for stereo separation. For really close-up views we may choose (for example) an angle of 1°, which is the equivalent of a pair of human eyes 14 about 2.5" apart belonging to an individual standing at 10 feet from an object such as a doorway 11 in FIG. 1. This 1° angle can create an approximate metric for remote stereo viewing, although (as examples) the angle could be 0.1° or 2°—the smaller values (in fact) resulting in longer stereo distances and simplifying the capture process.

In FIG. 3 again the points 9 and 10 may represent either a camera travelling at about 70 miles per hour for 1 second or a pair of cameras separated by a distance of 100 feet, in both cases giving a stereo separation of about 1°. With a single high-resolution camera (or pair of high-resolution cameras) this would give the same stereo perspective at one mile as an individual standing at 10 feet. (If a stereo angle of 0.1° were deemed adequate, then the stereo viewing distance could be 10 miles instead of one.) The difference in timing between the static and dynamic images would then be the delay for the distance travelled, which here would be one second. The stereo images from points 9 and 10 can be then conveyed in virtually real-time, plus this 1 second delay.

Again in FIG. 3 the points 15 and 16 may represent either a single, side-looking camera mounted (for example) on an aircraft travelling at 600 miles per hour or on a pair of cameras separated by a distance of one mile, which would give a 1° stereo separation at 50 miles. (Static cameras are unlikely, because they would need high elevation to see that distance over ground). In this case, with the aircraft, the stereo delay would be 6 seconds.

Once again in FIG. 3 the points 101 and 102 could represent a high-resolution satellite camera flying in low-earth orbit. In this case the camera would be looking downwards 200 miles (or at an angle at a somewhat greater distance). Completing an orbit every 90 minutes would mean that the satellite would cover 1° in 15 seconds, which would then define the stereo delay. (However, if the stereo separation were only 0.1° this would give just a 1.5 second delay for transmitting stereo signals.)

We can go yet further afield. As a first example, two (very) high-resolution earth-based cameras (say one on Mona Kea in Hawaii, another on Mount Hamilton in California) separated by a distance of 2,500 miles, thus subtending an angle of 1° on the moon, could view (within 2 seconds of real-time) a human being there in 3D, as if taken within ten feet.

As a second example, a high-resolution earth-based telescope (or one in earth-orbit, such as Hubble), could take 3D pictures of the sun. With one day's separation(1°), and with well-aligned telescopes, we could view flares and sun-spots in 3D as though in the vicinity.

In the examples above, for a 20° transit the duration of the video sequences will be 2 minutes for the aircraft and 5 minutes for the satellite (and 1.5 times longer for a 30° sweep).

For a single camera in motion the precise time interval required between stereo frames may be calculated as follows:

$$t = tn - to = d \tan \alpha / v$$

Where t is the time interval (tn−to) between frames 21 and 22 (and all subsequent pairs), d is the known distance to the surveillance target, V is the known linear velocity of the vehicle, and α is the prescribed angle. For example if α is 1° (as later described), the distance d (measured by radar) is 50 miles, and V (the velocity of the aircraft) is 600 miles per hour, then the time interval t will be 6 seconds.

It may be noted that none of these parameters is critical so long as they are consistent to the purpose. For example, if the angle α is either 0.9° or 1.1° it will simply create a slight change in stereo depth, which may be advantageous in either direction.

However, it must also be noted that when displayed the disparity cannot exceed a certain value. That is, the distance between the left and right projected mages can never exceed the distance between one's eyes (else one is forced to look wall-eyed at the display). So the chosen stereo angle is useful for viewing a scene only if an observer is to see that scene from the distance of the person standing in FIG. 1. That is, for an angle α of 1° the scene must be viewed as though the observer is standing at 10 feet, for an angle α of 0.1° it must be as though the observer is standing at 100 feet (or closer).

We can solve for this, and it is our capacity to zoom (instantly) to any distance at any time during the display. This depends on the chosen frame rate and the choice of the frame interval. For example, for a 60 fps rate on a 1° traverse we can match every sixtieth frame for each stereo pair 21/22, etc. —a viewing distance of ten feet. Alternatively, for a 0.1° traverse we can instead match every sixth frame—a viewing distance of 100 feet. Again, for a 10' (ten arc minute) traverse it would be every consecutive pair—a viewing distance of 600 feet. The capacity to zoom is useful for achieving an overall view of the scene as well as for close-ups. The shorter time intervals for long zooms will (almost always) result in better image quality.

Figure 4:
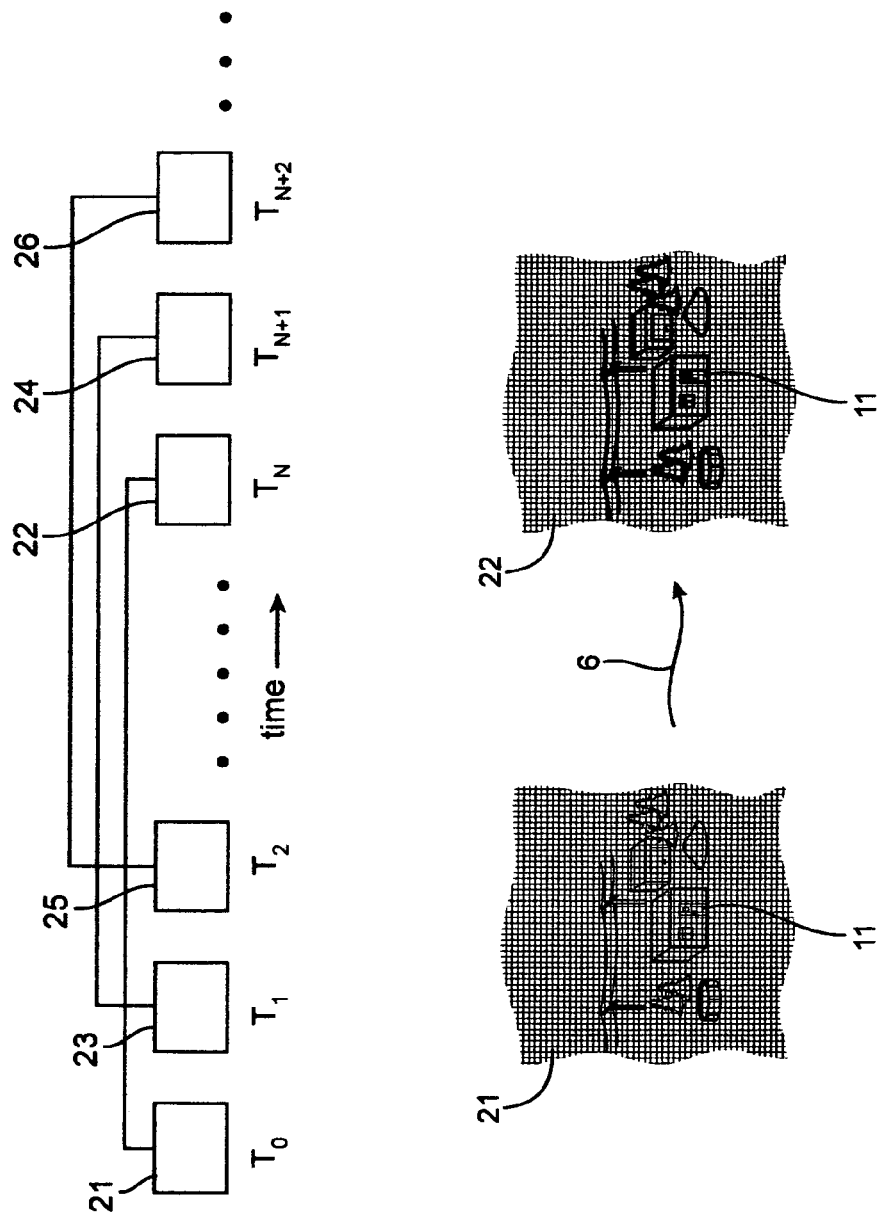
FIG. 4 shows a succession of frames as they would need to be viewed for stereo vision. (That is, frame 21 would be matched with later frame 22, and so on in succession to create 3D video).

FIG. 4 shows a sequence of linked frames. Earlier frames are linked to later ones to form the stereo pairs 21/22, 23/24 and 25/26, etc. The features 11, 12, 13 which define earlier frames are stored in a buffer to be correlated with the same features on later frames to define each stereo pair, one pair at a time. Once frames are brought into close correspondence and errors are accounted for they can be immediately processed and transmitted as 3D video. (See FIG. 10).

Figure 5:
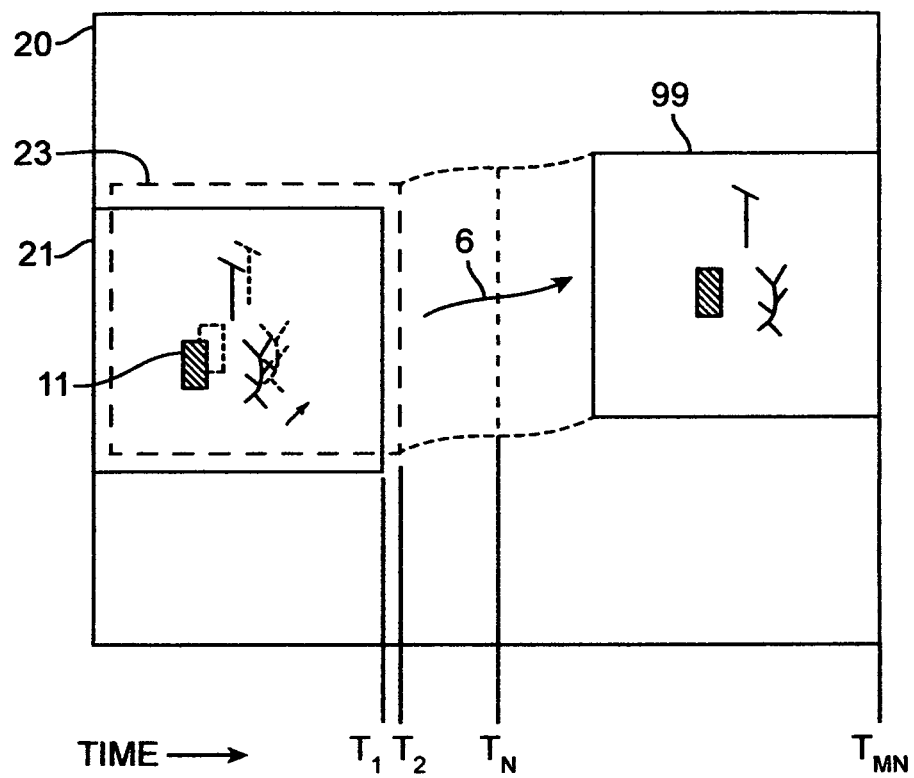
FIG. 5 shows successive frames 21, 23, etc. as they would appear on a detector if the camera were rigidly fixed to its vehicle.

FIG. 5 is an example of how the frames will appear on a camera rigidly mounted on a surveillance vehicle. The frame sizes will be limited in the imaging detector by the surveillance traverse. If the field of view of the camera is 60° then (in principle) the frames could traverse the detector for 60° from one side to the other. As a practical matter, a more likely traverse will be around 20°, so the frames will be larger. The detecting surface 20 shows a sequence of frames 21, 23 . . . etc. up to 99 on a pathway replicating the vehicle trajectory 6, at times $T_0, T_1 \ldots T_N$ etc.

Figure 6:
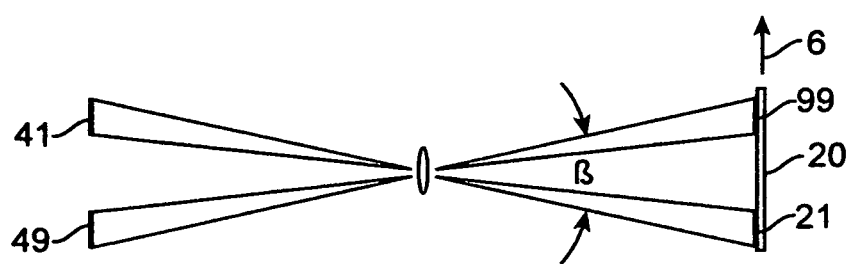
FIG. 6 is a plan view of the frames falling on the detector as the field is scanned from left view to right view.

FIG. 6 is a plan view of the frames moving across a detector with the camera rigidly mounted on a vehicle. The traverse angle β could be 20°, as above. The frames will move from 21 to 99 across detector 20, while the transiting camera views the field 41 first from the left side and ends with viewing the same field 49 from the right side.

There are advantages in a rigidly mounted camera, such as the inertia of the vehicle, which will slow the bumps and jolts, and the absence of tracking motor noise. However (and more practically) the camera may be made to rotate steadily to follow the area of interest, and convenient if the camera is gyroscopically stabilized. We will add an extra element of digital stabilization as will be seen below.

For purposes of tracking we can calculate the frame-to-frame change. For an aircraft flying a an simple trajectory (such as 6 in FIG. 1), the change of view per frame on an arc of 1° in 6 seconds, frame rate 60 per second, will be 10 seconds of arc in 1 second of time. The time is small and change in perspective tiny. Accordingly we can make simple adjustments.

Another calculation we can make is for the change in size of the features in the observed scene for the linear trajectory 9 of the camera in FIG. 1. For the camera at right angle to the scene and for a sweep off 20° the total change in size is 1.5%. (We get this by taking the secant of the half-angle). This means that for each 1° sweep between matching frames the change in feature size is very small—the maximum will be ¼%. (We shall calculate this later).

In another example the camera could cut closer to the scene of interest. For example, the camera could come (tangentially) from 50 miles to within 2 miles and out again. The calculations are simple but the size adjustments will be greater. The only quality to be preserved will be the stereo angle (although that is not, in fact, essential—depending on how the stereo is to be viewed).

In the present invention we stress the importance of feature tracking. For reasons of efficiency (or speed) we choose a minimum number of features, well spread out over the field of view, as a framework for that particular frame. For selection, any of a number of edge detection algorithms can be used, depending on the purpose (e.g. J. Canny, "A Computational Approach to Edge Detection," *IEEE Transactions on Pattern Analysis and Machine Intelligence*, Vol. PAMI-8, No. 6, 1986, pp. 679-698).

Referring again to FIG. 1, for continuous stereo vision of a single scene, it is important here to locate a single anchor feature as a fixation point near the scene's center and close to (and preferably on) the camera axis, since all other features will appear to turn around it during the camera trajectory. As mentioned above, a vertical object, such as a telephone pole 12, is ideal for a horizontal scan since its aspect will remain nearly constant. A single crossbar (for example) will help register the scene vertically. For simple surveillance in our example we choose a nearby doorway 11 as our fixation point and the telegraph pole 12 as one of several necessary ancillaries.

Figure 7:
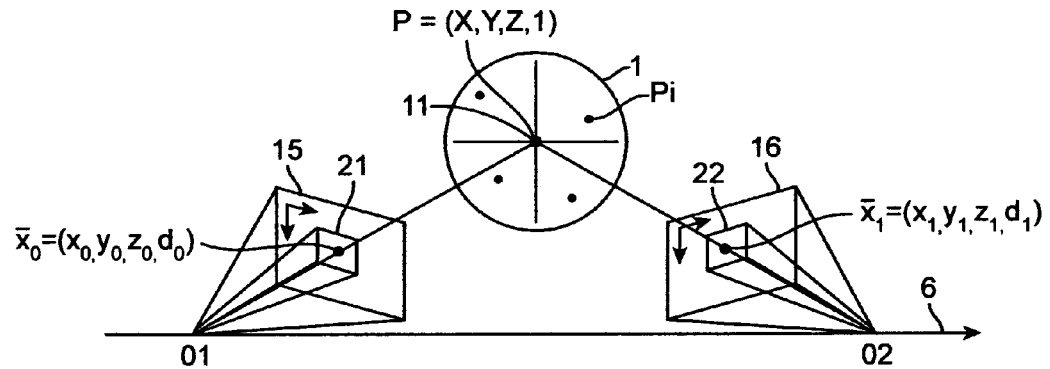
FIG. 7 shows two projections of an object onto frames 21 and 22 of a tracking camera for the purpose of calculation.

Shown graphically in FIG. 1 and theoretically in FIG. 7 we construct a framework of six to a dozen features 12, 13 . . . etc. around feature 11 which defines a sphere of interest 1. (This differs from the framework of a dozen features or more which define the frames 21, 22 . . . etc.)

For computation we surround each framework feature with fixed pixels to define a detecting area. This allows each feature movement within its limited area. We can now sample certain detecting areas at a higher rate than the frame, as will be seen later.

Using a notation common to the video industry (See Richard Szeliski, December 2006), we may consider the minimum of the sum of squares function $E_{SSD}(u)$ for feature correlation from frame 21 to frame 23 . . . etc.

$$E_{SSD}(u) = \Sigma_i [I_1(\chi_i + u) - I_0(\chi_i)]^2 = \Sigma_i (e_i)^2$$

Where $u = (u, v)$ is the feature displacement and $e_i = I_1(\chi_i + u) - I_0(\chi_i)$ is the error function or feature displacement offset within the detecting areas ($I_0$ being the reference feature image and $I_1$ the subsequent sample).

Because we are looking at objects (such as an anchor feature—the doorway 11 in FIG. 1) from slightly different viewpoints the images will be enough different that the value of $E_{SSD}(u)$ will never be identically zero. Choosing the lowest value (using the second differential) we obtain the closest correlation (in FIG. 7) of the contiguous pixels at each feature 11, 12, and 13 . . . etc. By calculating displacements we shift the anchor feature of frame 21 (at $T_0$) into registration with the anchor feature of frame 23 (at $T_1$)—and so on—to obtain the alignment of sequent frames.

We note also that the sum of squared differences function $E_{SSD}(u)$ above can be written as a Fourier transform:

$$\mathcal{F}\{E_{SSD}(u)\} = \mathcal{F}\{\Sigma_i [I_1(\chi_i + u) - I_0(\chi_i)]^2\} = \delta(f) \Sigma_i [\Sigma_i I_1^2(\chi_i) + I_0^2(\chi_i)] - 2I_0(f) I_1^*(f)$$

In this way $E_{SSD}(u)$ can be computed by subtracting twice the correlation function from the sum of the energies of the two images. (See R. Szeliski, above). For larger pixel areas and time derivatives this can be faster.

The Fourier transform above gets more complicated if we use the windowed function $$E_{WSSD}(u) = \Sigma_i \omega_0(\chi) \omega_1(\chi_i + u)[I_1(\chi_i + u) - I_0(\chi_i)]^2$$

where $\omega_0$ and $\omega_1$ for the features are zero outside their valid ranges. This is because $\omega_0$ and $\omega_1$ have their own Fourier transforms. However, we need this if reference pixels as well as features fall outside their frames with sudden jolts in transit.

We can establish limits for the rate of change of the error function $E_{SSD}(u)$ by taking its differential. If the rate of exchange exceeds a small value (we expect it to be changing slowly) then we trigger an examination of successive values and compare these to the trend line 6.

In the more extreme case where the features fall off the detector (as might be the case at points 17 and 18) the error function $E_{WSSD}(u)$ will return a value of zero.

Figure 8:
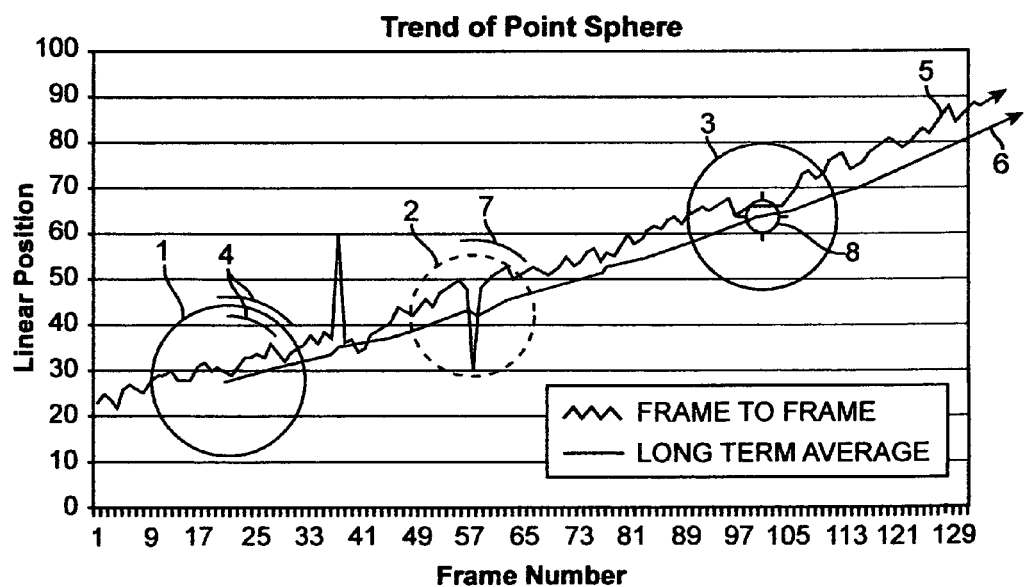
FIG. 8 illustrates some of these calculations in graphic form.

When either error function $E_{SSD}(u)$ or $E_{WSSD}(u)$ exceeds its boundaries (the first by exceeding its normal rate of change, the second by returning a value of zero) then we normalize the frames and the aspect according to the trend line described below For a camera rigidly fixed to its vehicle we now consider the importance of the anchor feature. (This for the moment will be a single feature, for example feature 11.) We use a partial differential equation to establish the trend line in what we may call the optic flow of the anchor feature, where $$J_1(\chi_i + u) = \nabla I_1(\chi_i + u) = (\partial I_1/\partial x, \partial I_1/\partial y)(\chi_i + u)$$

is the image gradient. This can perhaps be simplified as a summation of offsets over many frames divided by the number of frames to give a moving average of the trend, as shown in FIG. 8. The trend line 6 (as in FIG. 1 and FIG. 8) may be used to predict the next shift and create a new frame, and even create a sequence of frames in the event that the field of view is temporarily obscured or if the error functions return unusual values. In this way 3D imaging can continue uninterrupted.

In FIG. 2 the trend line 6 is useful if there are sudden excursions in the camera trajectory. If the excursions 17, 18 are short the trend line will hardly be affected, so the image will remain stabilized. If the excursion is longer 19, the trend line will move in the direction of the excursion and the image itself will slowly shift. We can use several trend lines with different temporal denominators, which can then diverge, converge and cross. Such information may be helpful and may be used predictively.

We can also use predictive oversampling (in our discussion very different in meaning to that used in analog/digital circuit design). In this technique the anchor feature (plus any number of ancillaries) may be oversampled by some factor—say at 600 fps—rather than 60 fps for the frame. (This is reasonable to do, since we are acting on just 1% of the pixels, say 50,000 in a 5 MP detector.) As we see from FIG. 2 the trend lines become progressively smoother with larger numbers and longer averages. However, a more important advantage is that in every ten samples the eighth or ninth sample of the anchor feature can be used to pre-calculate the correct position of the tenth frame and pull it into its transmissible position In other words there are two to three milliseconds of extra computation time to apply error adjustments before the frame is taken and sent.

To prevent aliasing or bias we can construct a trend line from randomly selected samples, for example, $3^{rd}$, $7^{th}$, $5^{th}$, $4^{th}$ etc., differing within each consecutive group of ten.

FIG. 7 shows the same scene with a tracking camera keeping the anchor point 11 fixed on the camera axis. In this case we can think of the scene as a sphere 1 of features with feature 11 as its center. Feature 11 will project onto an imaginary point 01 behind the detector on camera for frame 21, and similarly project to an imaginary point 02 through later frame 22. (The two images of feature 11 will line up on frames 21 and 22 through the algorithm in FIG. 9 using the least squares function ESSD(u) noted above). We note in FIG. 7 that (for illustration) image frames 21 and 22 are widely separated, but in fact they will be separated by only (about) 1° so there will be very little change in perspective.

In FIG. 7 point p=(X, Y, Z, 1) gets mapped to image coordinate $\chi_0=(x_0, y_0, z_0, d_0)$ in frame 21 to begin as rigid body motion $E_0$ $$\chi_0 = \begin{pmatrix} R_0 & t_0 \\ 0^T & 1 \end{pmatrix} p = E_0 p$$

with a perspective projection $P_0$ $$\bar{\chi}_0 \sim P_0 E_0 p$$

From this equation if we know the value of $d_0$ we can map it back to the coordinate p since $$p \sim P_0^{-1} E_0^{-1} \bar{\chi}_0$$

and then project it back to frame 22 with $$\bar{\chi}_1 \sim P_1 E_1 p = P_1 E_1 P_0^{-1} E_0^{-1} \bar{\chi}_0 M_{10} \bar{\chi}_0$$

In our case, since we have chosen a small stereo separation—just 1°—and if the features are compact (i.e. not too deep) at the scene, we can simplify by considering the scene to be flat as it is imaged onto the frames 21 and 22. Therefore the last row of matrix $P_0$ can be replaced with an equation that maps points on the plane $d_0=0$, which reduces the last equation to $$\bar{\chi}_1 = H_{10} \bar{\chi}_0$$

That is, we can reduce the equation from a 4×4 homography matrix in 3D to a 3×3 projective matrix in 2D. In addition since the scene is far away and the translation is small this can be reduced still further to a 2×3 affine matrix $A_{10}$ to substitute for $H_{10}$ in the equation above. Such simplifications can help bring remote 3D imaging calculations much closer to real-time.

We may also note that because a singular feature (such as anchor feature 11) can disappear unexpectedly, it is useful to surround it with a group of features (such as $p_i$ ... etc.) with a stable relationship to one another. We can illustrate this as the sphere 1 in FIG. 7 with its radius r as the averaged distance $h_i$ of the surrounding features from the anchor point and from each other:

$$r^2 = \Sigma_1^N h_i^2 / N$$

This radius r can be expected to change slowly with varying aspect unless one of the features is moving. Noticing a sudden increase in the rate of change of r, dr/dt, the program will trigger a comparison in the rate of change of all distances h, dh/dt and eliminate a feature which is moving relative to the others. If this point happens to be the anchor feature we can substitute an artificial placeholder—a virtual anchor—with its projected coordinates on the trend line. Otherwise, with one feature less, the new radius will become $$r^2 = \Sigma_1^{N-1} h_i^2 / (N-1)$$

which will define a new sphere and we continue as before. A virtual anchor could have been chosen all along but fixation works better with a tangible object.

It is important to distinguish between a sudden rate of change (as above) and a small rate of change with varying distance. By placing a confining limit on dr/dt we can use small changes in r to adjust image sizes in successive frames. In the example chosen here it will be a very small percentage.

As may be seen, the number of features for calculating r should be large enough to create a sufficient average, but not so large as to result in a weak calculation. Here we have chosen a number between six and twelve (it could be other numbers) in order to create a meaningful difference in radius r.

FIG. 8 illustrates the motion of the sphere 1 as its central point, the anchor feature 11, is tracked along the trend-line 6. The two curves 4 show the limits, predetermined as a (small) percentage of the oscillations of the sphere, crossing which limits 4 will trigger an examination of feature movement. Sphere 2 shows a sudden shrinkage of the radius, relative to previous radius 7, which is quickly readjusted with a slight change in trend line 6. Sphere 3 shows a loss of anchor feature 11 (here shown as void 8, the virtual anchor) and the trend continues (in this case) with little perceptible change.

Figure 9:
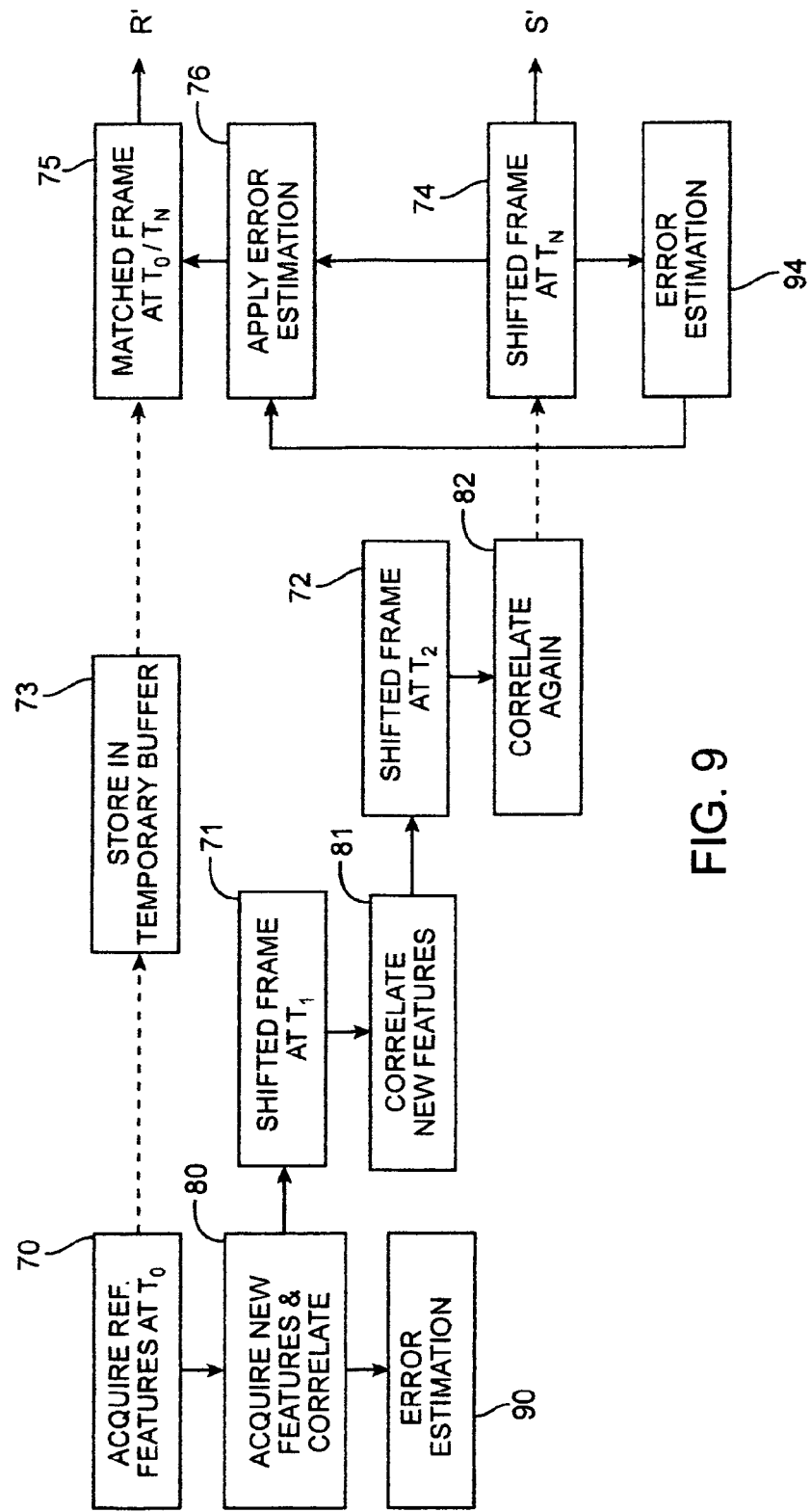
FIG. 9 is an algorithm for correlating the images of successive frames at times $T_0$, $T_1$ ... $T_N$ etc. along with error compensation

FIG. 9 shows a step-wise procedure for producing a 3D video stream. In 70, at time $T_0$, the initial reference features are acquired, as above. In 80 the same features, shifted slightly in camera transit, are re-acquired. These are correlated with the initial features through a least-squares function as shown above, and moved to 71. This process is repeated until we reach the matching stereo features 74 at time $T_N$.

Meanwhile (i) the first frame has been stored in buffer 73, and (ii) a (small) error function has been sent to 90 (below), which is updated steadily until it appears in 94. This error function is now applied in 76 to the stereo features in 75 to give the best possible registration with later features 74. We note here that registration is always applied retroactively. (It could be applied the other way round but would not be very successful.)

Figure 10:
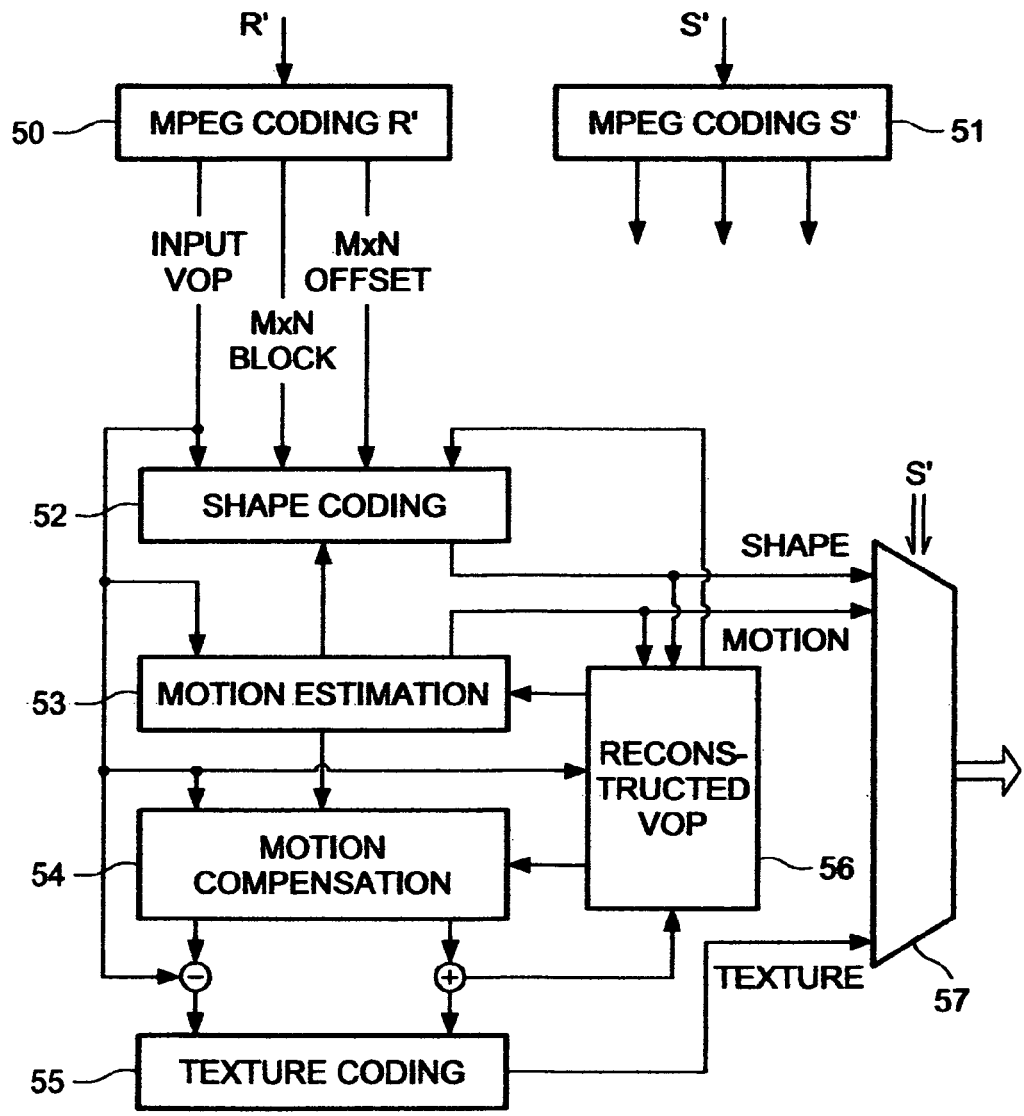
FIG. 10 is a compression algorithm for synchronously coding parallel data steams

Updated frame 75 and matching frame 74 are sent synchronously as R' and S'—a left and right stereo pair—to the MPEG coding units 50 and 51 of FIG. 10.

FIG. 10 is an algorithm for image management after capture. (This will conform to H.264/MPEG-4 AVC, depending on the type and quality of transmission required.) Parallel MPEG-4 coder blocks 50 and 51 synchronously compress the reference and sample data streams from 75 and 74. (They must be in the right order.) The data streams are further processed for shape coding 52, motion estimation 53, motion compensation 54, and texture coding 55, for reduction 56 into single (or parallel) data streams for transmission 57 to display or storage in MPEG-4 format.

(Note: We are following MPEG-4, which is a collection of methods defining compression of audio and visual (AV) digital data introduced in late 1998. It was designated a standard for a group of audio and video coding formats and related technology agreed upon by the ISO/IEC Moving Picture Experts Group (MPEG) under the formal standard ISO/IEC 14496. Uses of MPEG-4 include compression of AV data for web (streaming media) and CD distribution voice (telephone, videophone) and broadcast television applications). We could be implementing any other later protocol suitable for transferring high-speed data over airwaves or land-lines.

Figure 11:
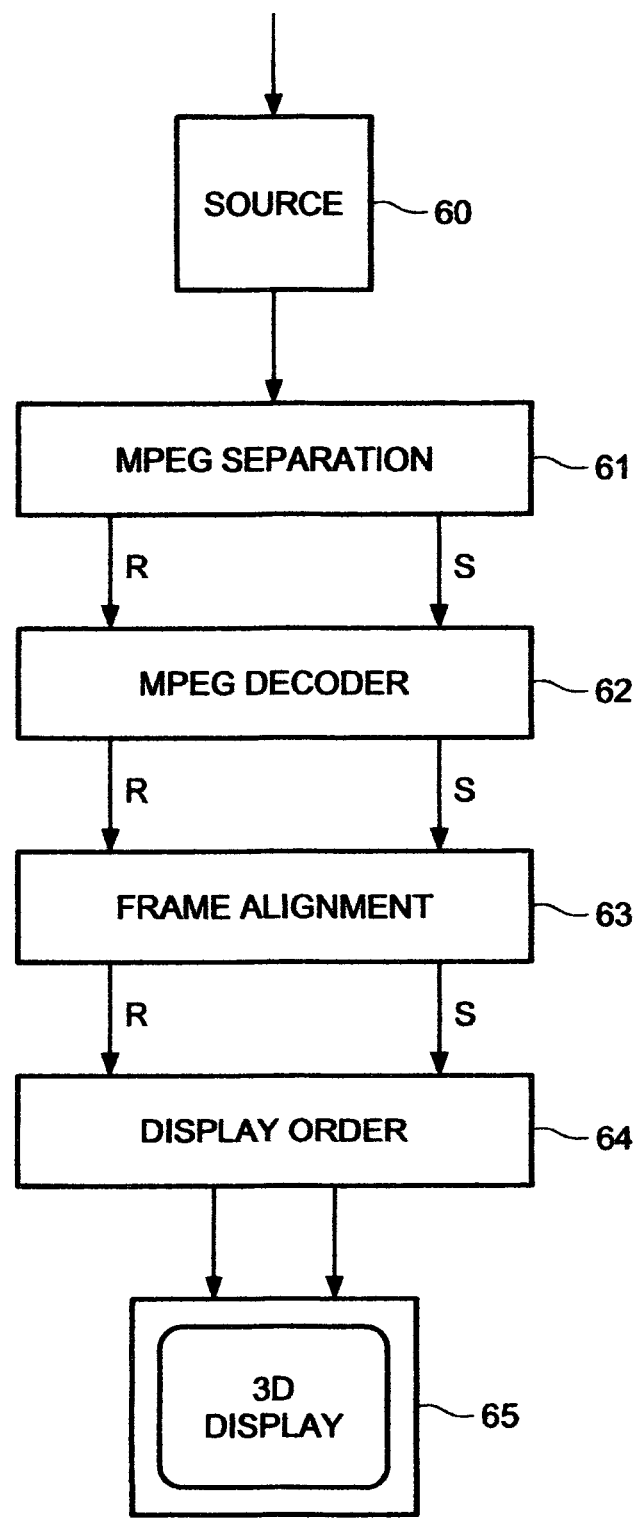
FIG. 11 shows a display driver with two incoming data streams for creating 3D on a display.

FIG. 11 shows the final output to the display. This can be live (in virtually real time) or from storage 60. The first block 61 represents the separation of data streams into left and right, if previously combined. The second block 62 is the MPEG-4 decoder, which decompresses the left and right frames for display. The third block 63 is for the accurate alignment of the left and right frames for producing (good) 3D on the particular type of display. (This may have to be adjusted for individual displays). 64 is the driver for the display 65 itself. In the case of TVs many, if not all, of these blocks are provided by the display manufacturer.

While the invention has been described and illustrated (in general) as one in which a single image detecting device poses upon a consistent and related set of features while describing a distant arc, in fact to those skilled in the art, the techniques of this invention can be understood and used as tools for creating and perfecting remote three-dimensional imaging throughout the electro-magnetic spectrum and beyond. It may be understood that although specific terms are employed, they are used in a generic and descriptive sense and must not be construed as limiting. The scope of the invention is set out in the appended claims.

It is hereby claimed:

1. A method for forming images in stereo pairs comprising the steps of:
   moving a detecting device, said detecting device having imaging means, along a scan path;
   capturing a sequence of image data formed as said imaging means moves along said scan path, said image data comprising an image frame sampled at an image spatial sampling density, and an anchor frame which is a spatial subset of said image data, said anchor frame sampled at an anchor feature spatial sampling density which is greater than said image spatial sampling density, the position of an anchor feature within said image frame being estimated from previous anchor feature positions to form a trend line;
   forming navigation information representative of travel of said detecting device along said scan path; said travel including perturbations and transformations;
   forming output images from said image data, including removing image distortion artifacts arising from said perturbations and transformations of said detecting device using said navigation information;
   said output images formed by spatially translating the positions of said image frames using said anchor feature identified in said anchor frames by said trend line;
   said sequence of image data forming interlaced frames appearing in such a manner and divided by such intervals on said detecting device that when subsequently transmitted and viewed will appear as three-dimensional images on a display.

2. The method in claim 1 wherein said step of moving said detecting device is a step of moving said detecting device remotely across a field of interest.

3. The method in claim 1 wherein said step of forming navigation information includes determining an anchor feature within each specific area of interest as a fixation point and:
   determining said trend line by taking moving averages of the apparent motion of said anchor feature on said detecting device; and
   accounting for and compensating for said perturbations in the movement of said anchor feature.

4. The method in claim 3 wherein accounting for and compensating for said perturbations of said anchor feature include averaging in a manner which will smooth image outputs to said display.

5. The method of claim 1 where said anchor feature spatial sampling density is at least ten times greater than said image spatial sampling density, and a image data size of said anchor frame is less than one percent of a image data size of said image frame.

6. The method in claim 5 wherein said anchor frame is examined for an anchor feature, said anchor feature used to form said trend line which includes past and image frames such that image frames which have not yet been acquired have a pre-determined spatial reference with respect to previously acquired images.

7. The method as in claim 6 wherein pixels are oversampled to sense trends predictively in relationships of a region of interest around, or apparent motion of, said anchor feature.

8. The method in claim 7 wherein said oversampling is randomized to eliminate at least one of bias or aliasing.

9. The method in claim 1 wherein said sequence of successive viewed image data corresponds to an angular separation in a range of 0.9 to 1.1 degrees with respect to said anchor feature.

10. The method in claim 1 wherein movements, losses or occlusions in a region of interest around said anchor feature are amended to smooth said sequence of image data when sent to said display.

11. The method in claim 1 wherein said transformations are simplified and short-cut in a manner to speed up image outputs to said display.

12. The method in claim 1 wherein said intervals correspond to certain angular separations between said sequential frames selected to enable stereo viewing as if in a vicinity of objects being viewed.

13. The method in claim 1 wherein a zoom request causes said intervals to be formed as subsets of said image frames, said subsets of said image frames selected to provide an angular separation which provides a requested zoom effect.

14. The method in claim 13 wherein said zoom effect is created instantaneously through software selection of said subsets of successive said image frames.

15. The method in claim 1 in which said detecting device having imaging means includes at least one of: a digital camera operative in the visible spectrum, an infra-red camera operative in the infra-red spectrum, microwave imaging device or a sonar acoustic imaging device.

16. An apparatus forming images in stereo pairs having:

a detecting device which moves along a scan path;

the detecting device capturing a sequence of image data formed as said imaging means moves along said scan path, said image data comprising an image frame sampled at an image spatial sampling density, and an anchor frame which is a spatial subset of said image data, said anchor frame sampled at an anchor feature spatial sampling density which is greater than said image spatial sampling density, the position of an anchor feature within said image frame being estimated from previous anchor feature positions to form a trend line;

the detecting device forming navigation information representative of travel of said detecting device along said scan path; said travel including perturbations and transformations;

the detecting device forming output images from said image data, including removing image distortion artifacts arising from said perturbations and transformations of said detecting device using said navigation information;

said output images formed by spatially translating the positions of said image frames using said anchor feature identified in said anchor frames by said trend line;

said sequence of image data forming interlaced frames appearing in such a manner and divided by such intervals on said detecting device that when subsequently transmitted and viewed will appear as three-dimensional images on a display.

\* \* \* \* \*